United States Patent
Suzuki et al.

(10) Patent No.: US 6,577,313 B1
(45) Date of Patent: Jun. 10, 2003

(54) IMAGE DATA CONTROL APPARATUS

(75) Inventors: Masayoshi Suzuki, Yokohama (JP); Yukio Isaka, Yokohama (JP); Yoshifumi Okamoto, Yokohama (JP); Masaru Igarashi, Kawasaki (JP); Yasuhito Suzuki, Kawasaki (JP); Kazuyuki Honda, Yokohama (JP); Koichiro Akimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/390,984

(22) Filed: Feb. 7, 1995

Related U.S. Application Data

(63) Continuation of application No. 08/037,688, filed on Mar. 25, 1993, now abandoned, which is a continuation of application No. 07/733,016, filed on Jul. 19, 1991, now abandoned, which is a continuation of application No. 07/393,116, filed on Aug. 4, 1989, now abandoned, which is a continuation of application No. 06/932,286, filed on Nov. 19, 1986, now abandoned.

(30) Foreign Application Priority Data

Nov. 28, 1985 (JP) ............................................. 60-266118

(51) Int. Cl.$^7$ ................................................ G06F 15/00
(52) U.S. Cl. ........................................................ 345/433
(58) Field of Search ................................. 345/433, 435, 345/113, 117, 147, 148, 149

(56) References Cited

U.S. PATENT DOCUMENTS

| | | | | |
|---|---|---|---|---|
| 4,016,544 A | * | 4/1977 | Morita et al. | 340/703 |
| 4,270,125 A | * | 5/1981 | Weisbecker | 340/798 |
| 4,360,876 A | * | 11/1982 | Girault et al. | 364/521 |
| 4,520,458 A | * | 5/1985 | Hattori et al. | 364/900 |
| 4,589,144 A | * | 5/1986 | Namba | 364/518 |
| 4,648,032 A | * | 3/1987 | Romero, Jr. et al. | 364/200 |
| 4,658,299 A | | 4/1987 | Tanaka et al. | |
| 4,688,181 A | * | 8/1987 | Cottrell et al. | 364/521 |
| 4,688,190 A | * | 8/1987 | Bechtolsheim | 364/900 |
| 4,701,863 A | * | 10/1987 | Bruce | 364/518 |
| 4,727,363 A | * | 2/1988 | Ishii | 340/724 |
| 4,750,107 A | * | 6/1988 | Buggert | 364/200 |
| 4,766,431 A | * | 8/1988 | Kobayashi et al. | 340/799 |
| 4,833,596 A | * | 5/1989 | Buckland et al. | 364/200 |
| 4,837,844 A | * | 6/1989 | Urushibata | 382/44 |

* cited by examiner

*Primary Examiner*—Phu K. Nguyen
(74) *Attorney, Agent, or Firm*—Fitzpatrick, Cella, Harper & Scinto

(57) ABSTRACT

An image data control apparatus includes a memory for storing image data and a reader for reading the image data from the memory. The reader can operate in a first mode for erasing the image data in association with the reading of the image data from the memory and can operate in a second mode for restoring the read image data in the storage means in association with the reading of the image data from the memory.

26 Claims, 7 Drawing Sheets

FIG.5
PRIOR ART
(a)
(b)
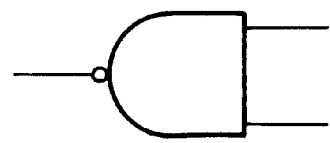
(c)
IC 1

IMAGE DATA CONTROL APPARATUS

This application is a continuation of application Ser. No. 08/037,688, filed Mar. 25, 1993, now abandoned, which was a continuation of application Ser. No. 07/733,016, filed Jul. 19, 1991, now abandoned, which was a continuation of application Ser. No. 07/393,116, filed Aug. 4, 1989, now abandoned, which was a continuation of application Ser. No. 06/932,286, filed Nov. 19, 1986, now abandoned.

BACKGROUND OF THE INVENTION

1. Field of the Invention

The present invention relates to a control apparatus for controlling image data such as a bit image.

2. Related Background Art

In a prior art text output apparatus such as a laser beam printer which develops text information such as code data sent from a host computer and changes it to a bit image stored in an internal random access memory and reads it out, the bit data to the random access memory (RAM) must be overwritten.

Namely, when a pattern shown in FIG. 5(a) is to be outputted, a pattern shown in FIG. 5(b) is first written into the RAM and then a pattern shown in FIG. 5(c) is overwritten.

Since it is very difficult to determine whether the pattern to be written is to be simply written or to be overwritten, it is necessary to previously clear the RAM. Namely, after the pattern has been developed in the RAM, it is necessary to read it out and clear that portion of the RAM for which printing is completed.

Where a plurality of copies of one page are to be made, if the pattern is read out of the RAM and the portion of the RAM for which printing is completed is cleared, it is necessary for the host computer to send the same code data as many times as the number of copies and to develop the same bit image in the RAM the plurality of times.

If the text output apparatus operates at a low speed and a CPU (controller) processing speed is sufficiently high, the development of the same bit image on the RAM the plurality of times may be attained only by the operation of the CPU. However, in a high speed text output apparatus such as a laser beam printer, the CPU operation is not sufficient and a high speed sub-processor is usually used for parallel processing with the CPU. As a result, the processing apparatus is very expensive.

SUMMARY OF THE INVENTION

It is an object of the present invention to eliminate the above shortcoming.

It is another object of the present invention to provide an improved image data control apparatus.

It is another object of the present invention to provide a control apparatus which can process image data with a simple construction.

It is another object of the present invention to provide an image data control apparatus having a high image data processing efficiency.

It is another object of the present invention to provide an image data control apparatus which can process image data at a high speed.

It is another object of the present invention to provide an image data control apparatus which can simply process image data.

It is another object of the present invention to provide an inexpensive data control apparatus which can process data at a high speed without an expensive processor.

These and other objects, features and advantages of the present invention will be apparent from the following detailed description of the preferred embodiments of the invention and the appended claims.

BRIEF DESCRIPTION OF THE DRAWINGS

FIGS. 5(a) to 5(c) illustrate overwriting of a pattern.

DETAILED DESCRIPTION OF THE PREFERRED EMBODIMENTS

Figure 1:
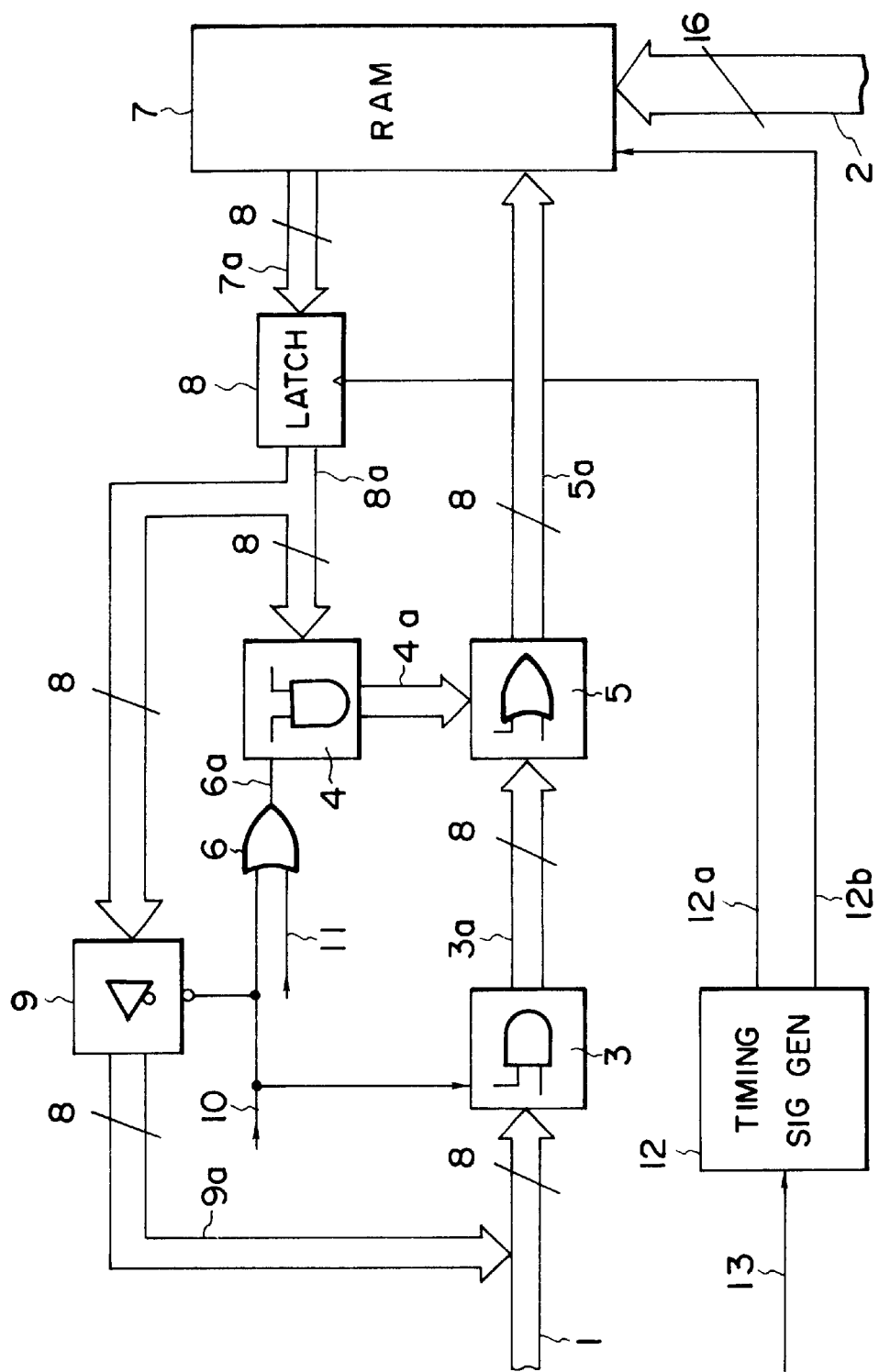
FIG. 1 shows a circuit diagram of one embodiment of a data control apparatus of the present invention.

FIG. 1 shows a circuit diagram of one embodiment of a data control apparatus of the present invention. Numeral 1 denotes an 8-bit bilateral data bus of a CPU (central processing unit), through which character bit image data is transferred. Numeral 2 denotes a 16-bit address bus which specifies a write address and a read address of a storage device, a RAM 7. Numerals 3 and 4 denote AND gates which produce AND gate outputs 3a and 4a, respectively. Numerals 5 and 6 denote OR gates which produce OR gate outputs 5a and 6a, respectively. Numeral 8 denotes a latch which latches a read data 7a read from the RAM 7. Numeral 9 denotes a three-state gate which sends a latch output 8a as a gate output 9a to the bilateral data bus 1 in accordance with a read/write signal transferred in the apparatus on line 10 and output by the CPU. Numeral 11 denotes a line which transfers, in the apparatus, second information (the first being the read/write signal), status which is at an "H" level in a CPU read mode if the RAM 7 is not cleared in the CPU read mode when a copy is to be produced, and is at a "L" level in the CPU read mode if the RAM 7 is cleared in the CPU read mode. In a CPU write mode, the status signal 11 may be either "H" level or "L" level. Numeral 12 denotes a timing signal generator which sends an enable signal 12a to the latch in synchronism with a start signal 13 sent from the CPU and sends or transfers a write signal along a line 12b to the RAM 7. The timing signal generator may be constructed by a well-known shift register or counter.

Referring to FIGS. 2(a) to 2(i), the timing control for the overwriting to the RAM is explained.

Figure 2:
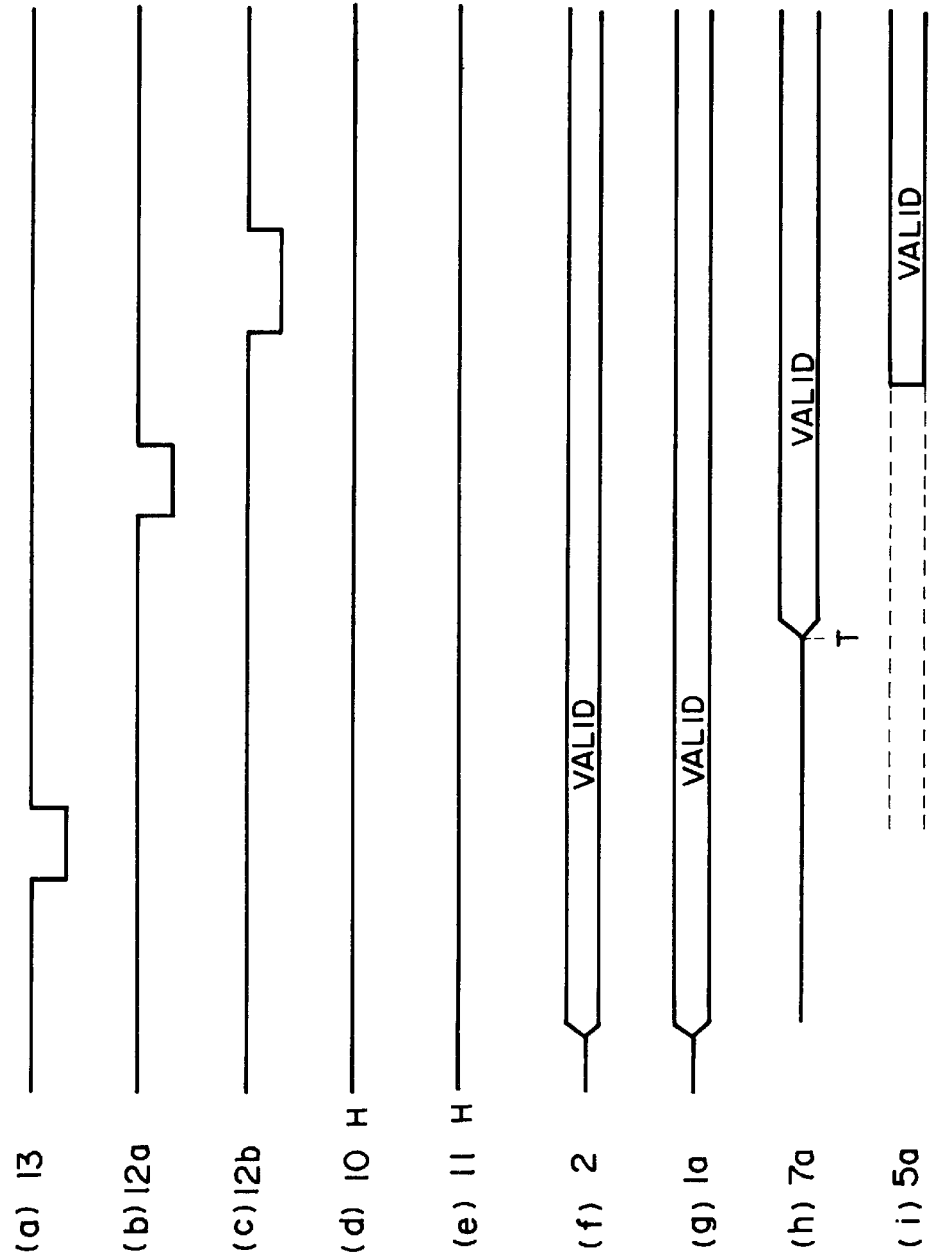
FIGS. 2(a) to 2(i) show timing charts for explaining overwriting in a RAM shown in FIG. 1, FIGS. 3(a) to 3(i) show timing charts for explaining erasing of the RAM shown in FIG. 1, FIGS. 4(a) to 4(i) show timing charts for explaining the operation of FIG. 1 in a multiple copy mode.

FIGS. 2(a)–2(i) show timing charts for explaining the overwriting to the RAM 7 of FIG. 1. FIG. 2(a) shows the start signal 13, FIG. 2(b) shows the enable signal 12a, FIG. 2(c) shows the write signal 12b, FIG. 2(d) shows the read/write signal 10, FIG. 2(e) shows the status signal 11 which is at the "H" level, FIG. 2(f) shows the status of the address bus 2, FIG. 2(g) shows the dot pattern information 1a of characters on the bilateral data bus 1, FIG. 2(h) shows the read data 7a, and FIG. 2(i) shows the OR gate output (overwriting data) 5a.

Code information sent from a host apparatus (not shown) is converted to the dot pattern information (dot pattern data 1a shown in FIG. 2(g)) by the CPU (not shown), and it is supplied to the bilateral data bus 1. Then, the CPU sends the address information to the address bus 2 for the RAM 7 in order to develop the dot pattern data 1a sent to the bilateral data bus 1 onto the RAM 7, and sets the read/write signal 10 to the "H" level. Then, it sends the start signal 13 to the timing signal generator 12 to start the timing signal generator 12.

When the RAM 7 receives the address information from the address bus 2, it supplies the read data 7a to the latch 8 at a timing T shown in FIG. 2(h) after a predetermined access time. The latch 8 latches the read data 7a in synchronism with the enable signal 12a supplied from the timing signal generator 12. Since the read/write signal 10 is now at the "H" level, the AND gates 3 and 4 are open. Accordingly, the latch output 8a and the AND gate output 4a are equal, and the content of the bilateral data bus 1 and the AND gate output 3a are equal. Since the read/write signal 10 is at the "H" level, the OR gate output 6a of the OR gate 6 is at the H level regardless of the level "H" or "L" of the status signal 11. The three-state gate 9 is kept closed.

The AND gate output 4a and the AND gate output 3a are ORed by the OR gate 5, and the OR gate output 5a is written into the RAM 7 in synchronism with the write signal 12b supplied from the timing signal generator 12. Thus, the ORed information of the data stored in the RAM 7 and the data on the data bus 1 is again written into the RAM 7 for overwriting. It will be seen that gates 3, 4, 6 and 9 and line 12a, carrying the latch enable signal, together control transfer of the image data, and in the write mode synthesize data on the bus 1 with data already in RAM 7.

Referring to FIGS. 3(a) to 3(i), the timing control for the erasing of the RAM 7 of FIG. 1 is explained.

FIGS. 3(a) to 3(i) show timing charts for explaining the erasing of the RAM 7 shown in FIG. 1. The elements similar to those shown in FIGS. 2(a) to 2(i) are designated by like numerals. After the dot pattern data 1a has been developed in the RAM 7, it is sent to a printer unit (not shown). If only one output of the dot pattern data 1a developed in the RAM 7 is required, it is not necessary to retain the dot pattern data and it is necessary to clear the RAM content at that address because of overwriting. The CPU sends to the address bus 2 the address information for reading the content of the RAM 7 in order to send the dot pattern data 1a developed on the RAM 7, and sets the read/write signal 10 to the "L" level and the status signal 11 to the "L" level. It also starts the timing signal generator 12 at a timing shown in FIG. 3(a). After a predetermined access time, the RAM 7 sends out the read data 7a which is latched in the latch 8 in synchronism with the enable signal 12a. Since the read/write signal 10 is at the "L" level, the three-state gate 9 is open and the same content as the read data 7a from the RAM 7 is sent to the bilateral data bus 1. Since the read/write signal 10 and the status signal 11 are both at the "L" level, the OR gate output 6a is at the "L" level and the AND gate 4 and the AND gate 3 are kept closed. Accordingly, the AND gate outputs 4a and 3a are both at the "L" level and the OR gate output 5a is also at the "L" level. As a result, the OR gate output 5a which is at the "L" level is written into the RAM 7 in synchronism with the write signal 12b supplied from the timing signal generator 12 so that the RAM 7 is cleared.

Referring to FIGS. 4(a) to 4(i), the read operation of the CPU in the multi-copy mode is explained.

FIGS. 4(a) to 4(i) show timing charts for explaining the operation of FIG. 1. Similar elements to those shown in FIGS. 2(a) to 2(i) are designated by like numerals.

In the multi-copy mode, unlike the single copy mode, it is not necessary to clear the RAM 7 whenever the dot pattern data 1a is read from the RAM 7 and sent to the printer unit such as a laser beam printer, but the clear operation is necessary only for the last page of the multiple copies.

The CPU sends the address information (shown in FIG. 4(f)) to the RAM 7 through the address bus 2 in the same manner as that described above, and sets the read/write signal 10 (shown in FIG. 4(d)) to "L" level. On the other hand, the CPU sets the status signal 11 (shown in FIG. 4(e)) to the "H" level as opposed to the previous case. It also sends the start signal 13 (shown in FIG. 4(a)) to the timing signal generator 12 to start it. After a predetermined access time, the RAM 7 sends out the read data 7a (shown in FIG. 4(H)) which is latched in the latch 8 in synchronism with the enable signal 12a (shown in FIG. 4(a)). Since the read/write signal 10 is now at the "L" level, the three-state gate is open and the AND gate 3 is closed. Accordingly, the same content as the read data 7a supplied from the RAM 7 is sent to the bilateral data bus 1. Since the AND gate output 3a is "L" level and the status signal 11 is at the "H" level, the OR gate output 6a of the OR gate 6 is at the "H" and the AND gate 4 is open. Accordingly, the latch output 8a of the latch 8 and the AND gate output 4a are identical. Since the AND gate output 3a is now at the "L" level, the latch output 8a and the AND gate output 5a (shown in FIG. 4(i)) are identical. Accordingly, the AND gate output 5a which is identical to the read data 7a is written into the RAM 7 in synchronism with the write signal 12b supplied from the timing signal generator 12. Thus, the content of the RAM is not changed but the previous data is preserved. At the last page of the multi-copy, the status signal 11 is set to the "L" level so that the data on the RAM 7 is cleared.

Figure 6:
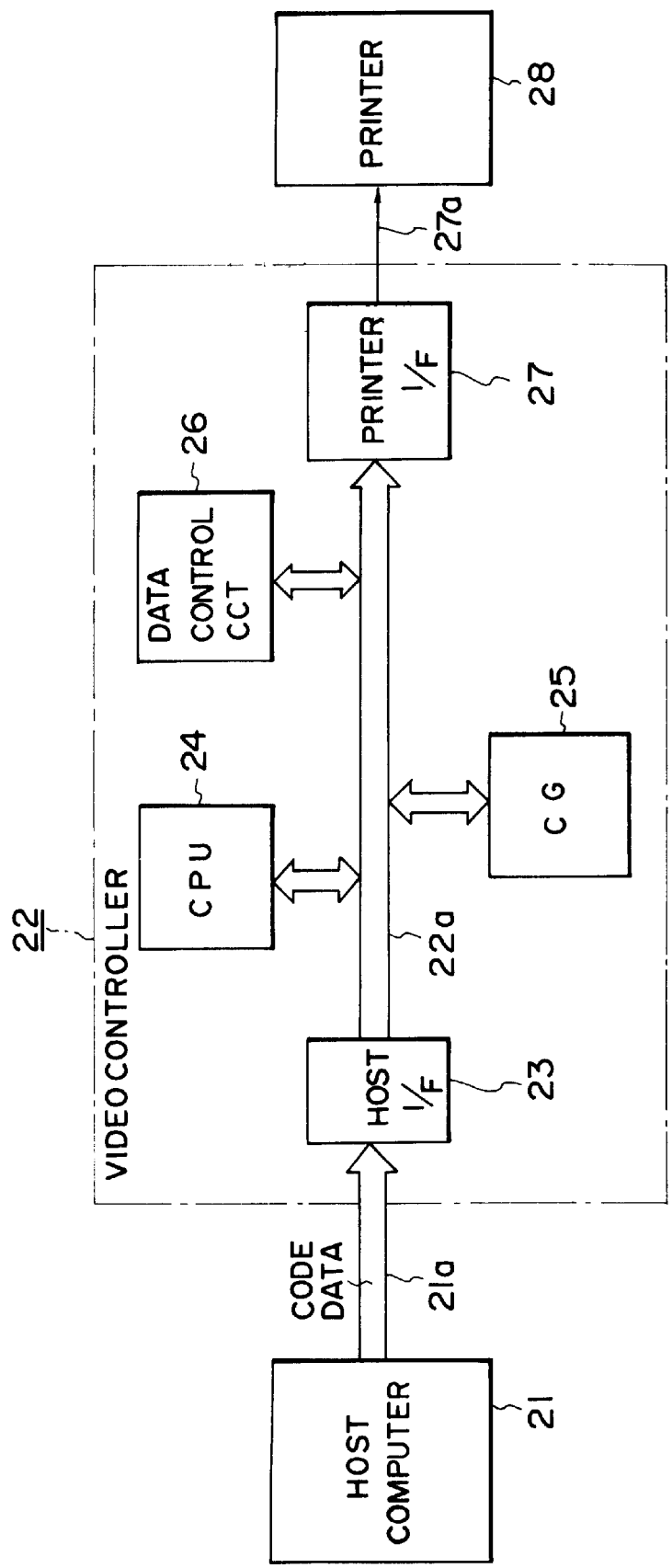
FIG. 6 shows a configuration of an image data processing system to which the present invention may be applied.

FIG. 6 shows a configuration of an image data processing system to which the present invention is applied.

Numeral 21 denotes a host computer for sending out control data code, data etc., numeral 21a denotes a data bus for transferring data sent from the host computer 21 to a host interface (IF) 23, numeral 23 denotes the host interface for connecting the host computer 21 to a video controller 22, numeral 22 denotes the video controller which prepares dot pattern data in accordance with the control data, the code data, etc., sent from the host computer 21 and sends it to a printer 28, and numeral 28 denotes the printer such as a laser beam printer which forms a dot image on a record sheet in accordance with a video signal 27a sent from the video controller 22. The video controller 22 includes the host interface 23, a CPU 24, a character generator 25, a data control circuit 26, a printer interface 27, a system bus 22a, and so on. The system bus 22a includes a data bus and an address bus. The CPU 24 receives character code data sent from the host computer 21 through the host interface 23, and accesses the character generator 25 based on the character code data to generate a dot pattern. The CPU 24 also sends the dot pattern generated by the character generator 25 to the data control circuit 26 through the system bus 22a to write it into the RAM 7 of the data control circuit 26. The data control circuit 26 corresponds to the circuit shown in FIG. 1, and it overwrites the dot pattern on the RAM 7 in accordance with the read/write signal 10, status signal 11, start signal 13 and the address signal sent from the CPU 24, repeatedly sends the same dot pattern on the RAM 7 to the printer 28 for multi-copy operation, or clears the dot pattern on the RAM 7. The printer interface 27 connects the video controller 22 and the printer 28, and it converts the dot image data (dot pattern) sent from the RAM 7 of the data control circuit 26 through the system bus 22a to the video signal 27a, which is sent to the printer 28.

The operation of the circuit of FIG. 6 is explained. When the control data and the data code are sent to the CPU 24 from the host computer 21 through the data bus 21a and the host interface 23, the CPU 24 sends the code data to the character generator 25 in accordance with the input control data to generate the dot pattern. The dot pattern generated by the character generator 25 is developed in the RAM 7 of the data control circuit 26 addressed by the CPU 24. The RAM 7 may store one page of the dot pattern. When the CPU 24 detects the completion of writing of the dot pattern into the RAM 7, it sends the dot pattern on the RAM 7 to the printer 28 to carry out the printing. The dot pattern from the RAM 7 is converted to the video signal 27a by the printer interface 27 and it is supplied to the printer 28. The printer 28 modulates a laser beam with the input video signal 27a to form a reproduced image on a record sheet (not shown).

Figure 7:
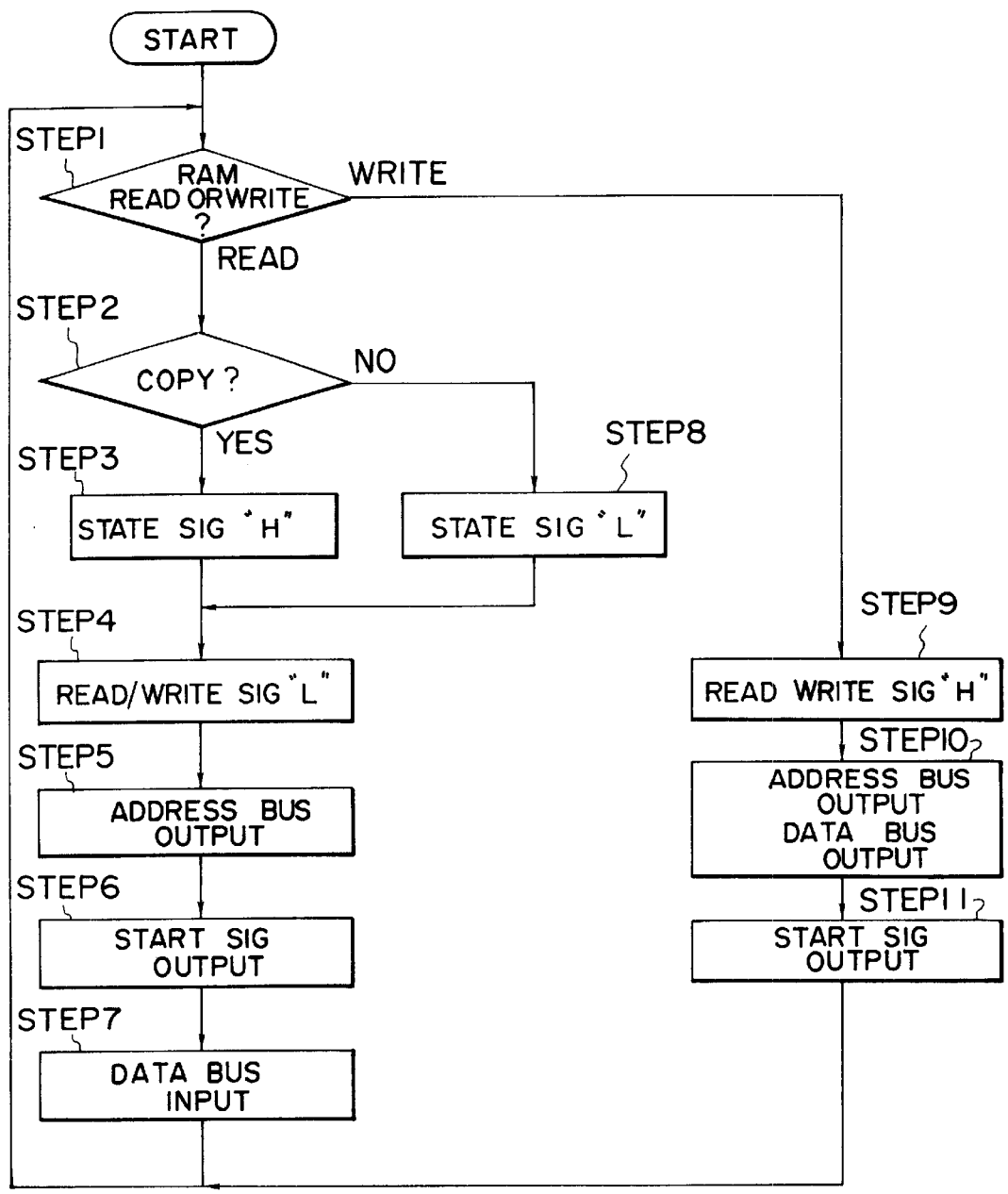
FIG. 7 shows a flow chart for explaining the operation of FIG. 1.

The operation of the circuit shown in FIG. 1 is explained with reference to a flow chart shown in FIG. 7. The flow chart of FIG. 7 is stored in a ROM in the CPU 24 as a program.

Figure 4:
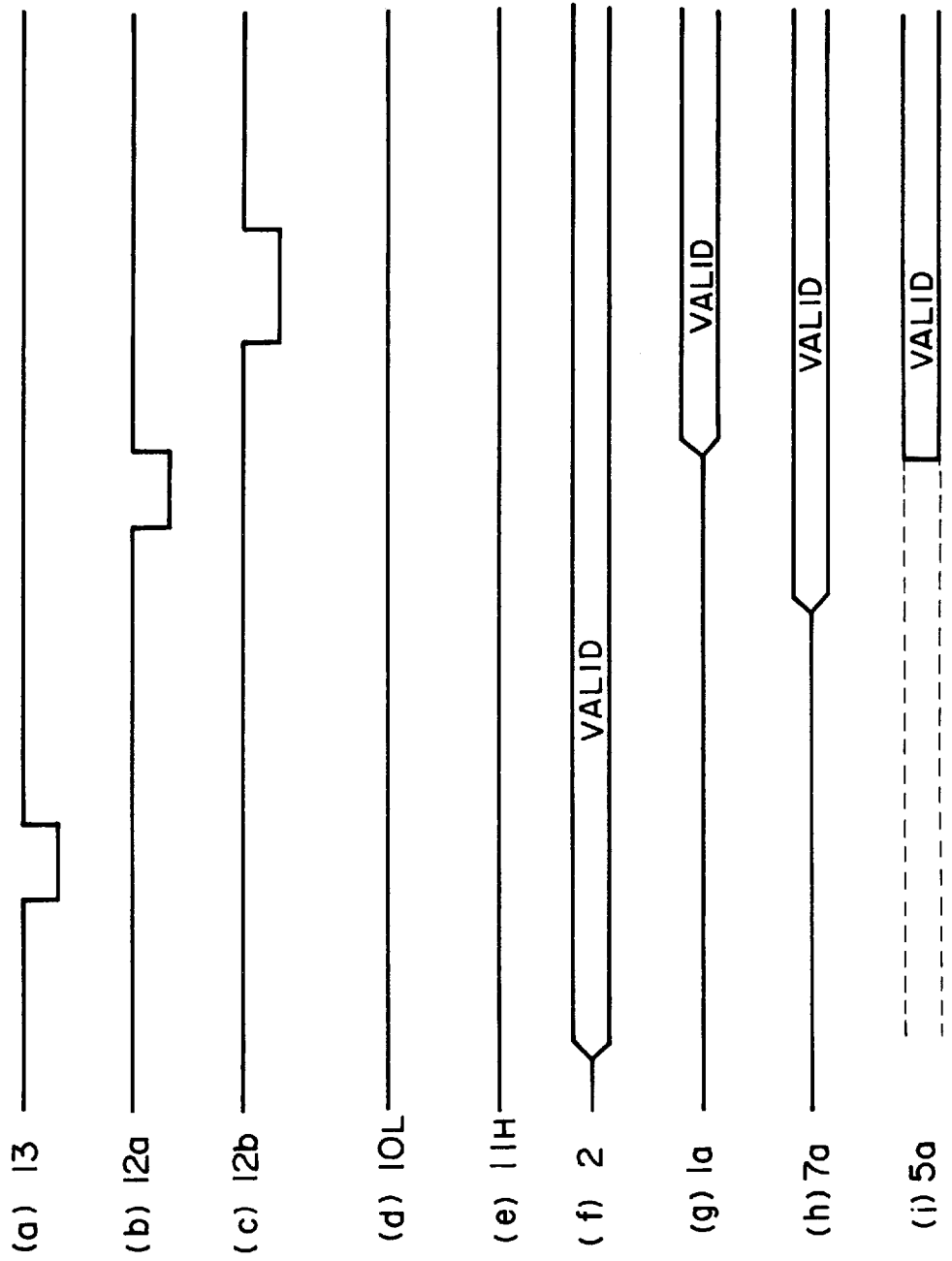

In a step 1, the CPU determines whether the access to the RAM 7 is read or write. If it is read, the process proceeds to a step 2. In the step 2, whether the page is printed a plural number of times by repeatedly using RAM 7 (that is, copy output mode) or not is checked. If it is in the copy output mode, the RAM 7 need not be cleared. Thus, in a step 3, the status signal 11 is set to the "H" level and, in a step 4, the read/write signal 10 is set to the "L" level (read). Then, in a step 5, address information to the RAM 7 is sent out to the address bus 2. In a step 6, the start signal 13 is produced. Thus, the timing signal generator 12 is started and the signals shown in FIG. 4 are produced. After a predetermined time period, the dot pattern data in the RAM 7 is supplied to the data bus 1. The dot pattern data supplied from the RAM 7 is again written into the RAM 7 through the OR gate 5. Then, the process proceeds to a step 7 where the CPU receives the data on the data bus 1 and sends it to the printer 28. Then, the process returns to the start. In the copy output mode, the same process is repeated so that the data on the RAM 7 are sequentially sent to the printer and the same data is developed in the RAM 7.

The operation for the last page of the multi-copy is explained. The process jumps from the step 2 to a step 8. Since it is necessary to clear the RAM 7 at the last page, the status signal 11 is set to "L" level. Then, the process proceeds to the steps 4 to 7 and the CPU receives the data of the RAM 7. However, the data on the RAM 7 is cleared because the data is not fed back to the RAM 7.

The CPU write operation is explained. In the write operation, the process jumps from the step 1 to a step 9 where the read/write signal 10 is set to the "H" level (write). In a step 10, the address information is supplied to the address bus 2, and the data to be written into the RAM 7 is supplied to the data bus 1. In a step 11, the start signal 13 is supplied to the timing signal generator 12. Thus, the timing signal generator 12 is started. As described above, the ORed information of the data previously written and the data on the data bus 1 is written into the RAM 7.

Figure 3:
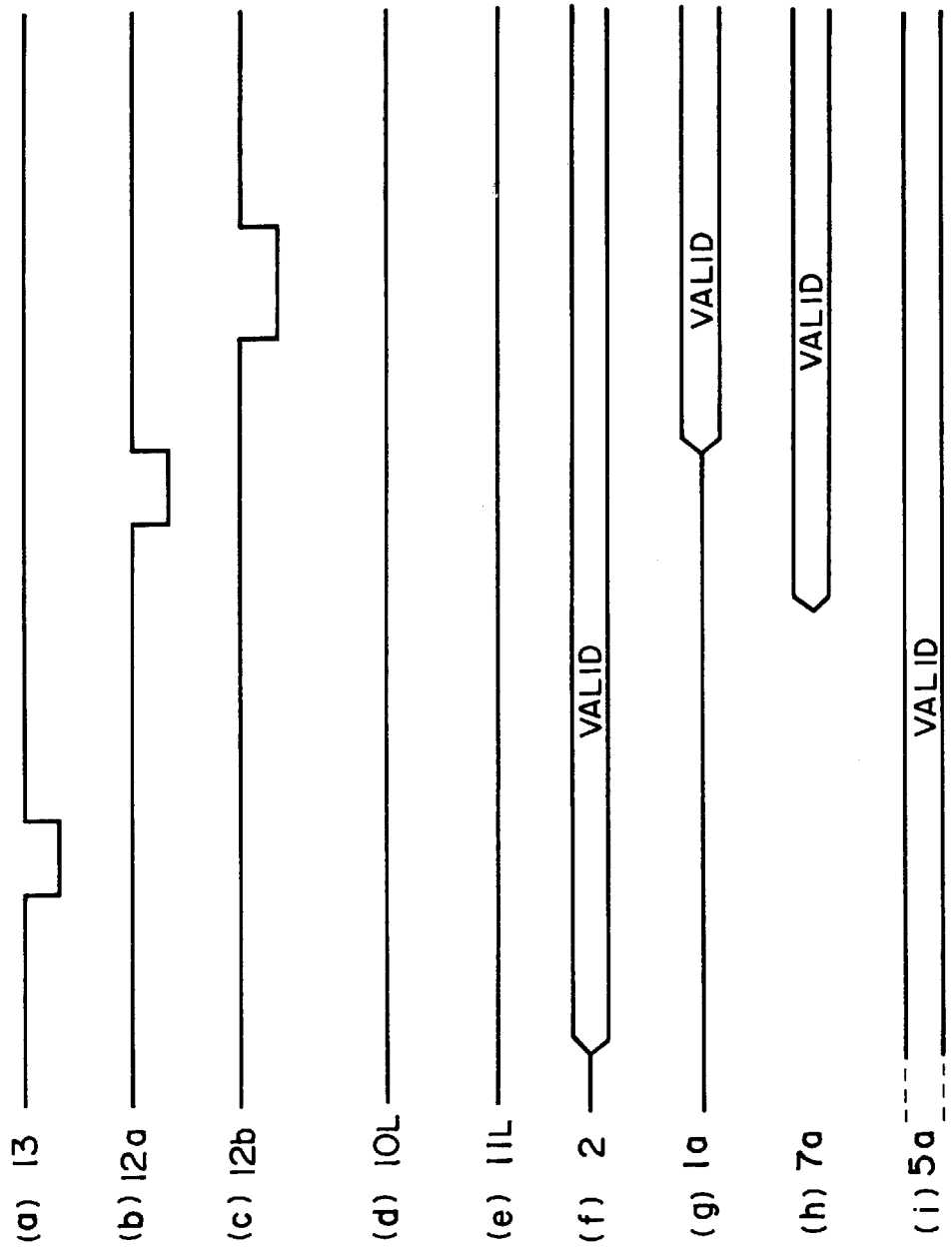

In a non-overwriting mode, it is necessary to write new data into the RAM 7 after the RAM 7 shown in FIG. 3 has been cleared.

The present invention is not limited to the illustrated embodiments but various modifications may be made within a scope of the appended claims.

What is claimed is:

1. A data control apparatus which writes data into and reads data from an address of memory means by one designation operation of the address, said apparatus comprising:

latch means for latching first data read from the memory means;

first transfer means for enabling or disabling transfer of the first data latched by said latch means;

second transfer means for enabling or disabling transfer of second data different from the first data; and data writing means for generating data for clearing the first data stored in the memory means and writing the generated data into the memory means when said first and second transfer means both disable data transfer, and for synthesizing the first data latched by said latch means with the second data and writing the synthesized data into the memory means when said first and second transfer means both enable data transfer.

2. An apparatus according to claim 1, wherein said first transfer means comprises an AND gate.

3. An apparatus according to claim 1, wherein said second transfer means comprises an AND gate.

4. An apparatus according to claim 1, wherein the memory means stores bit map data.

5. An apparatus according to claim 1, wherein said apparatus comprises a printer.

6. An apparatus according to claim 1, wherein the second data is input from an external apparatus.

7. A printer apparatus which writes data into and reads data from an address of memory means by one designation operation of the address and which prints data stored in the memory means, said apparatus comprising:

latch means for latching first data read from the memory means;

first transfer means for enabling or disabling transfer of the first data latched by said latch means;

second transfer means for enabling or disabling transfer of second data different from the first data;

data writing means for generating data for clearing the first data stored in the memory means and writing the generated data into the memory means when said first and second transfer means both disable data transfer, and for synthesizing the first data latched by said latch means with the second data and writing the synthesized data into the memory means when said first and second transfer means both enable data transfer, and print means for printing the data written into the memory means by said data writing means.

8. An apparatus according to claim 7, wherein said first transfer means comprises an AND gate.

9. An apparatus according to claim 7, wherein said second transfer means comprises an AND gate.

10. An apparatus according to claim 7, wherein the memory means stores bit map data.

11. An apparatus according to claim 7, wherein the second data is input to said apparatus from a host computer.

12. A data control apparatus which writes data into and reads data from an address of memory means by one designation operation of the address, said apparatus comprising:

latch means for latching first data read from the memory means;

first transfer means for enabling or disabling transfer of the first data latched by said latch means;

second transfer means for enabling or disabling transfer of second data different from the first data; and writing control means, responsive to whether said first and second transfer means enable or disable data transfer, for generating data for clearing the first data stored in the memory means and writing the generated data into the memory means or for synthesizing the first data latched by said latch means with the second data and writing the synthesized data into the memory means.

13. An apparatus according to claim 12, wherein said first transfer means comprises an AND gate.

14. An apparatus according to claim 12, wherein said second transfer means comprises an AND gate.

15. An apparatus according to claim 12, wherein said writing control means generated the data for clearing the first data stored in the memory means and writes the generated data into the memory means when said first and second transfer means both disable the data transfer.

16. An apparatus according to claim 12, wherein said writing control means synthesizes the first data latched by said latch means with the second data and writes the synthesized data into the memory means when said first and second transfer means both enable the data transfer.

17. An apparatus according to claim 12, wherein the memory means stores bit map data.

18. An apparatus according to claim 12, wherein said apparatus comprises a printer.

19. An apparatus according to claim 12, wherein the second data is input from an external apparatus.

20. A printer apparatus which writes data into and reads data form an address of memory means by one designation operation of the address and which prints data stored in the memory means, said apparatus comprising:

latch means for latching first data read from the memory means;

first transfer means for enabling or disabling transfer of the first data latched by said latch means;

second transfer means for enabling or disabling transfer of second data different from the first data;

data writing means responsive to whether said first and second transfer means enable or disable data transfer, for means and writing the generated data into the memory means, or for synthesizing the first data latched by said latch means with the second data and writing the synthesized data into the memory means; and print means for printing the data written into the memory means by said data writing means.

21. An apparatus according to claim 20, wherein said first transfer means comprises an AND gate.

22. An apparatus according to claim 20, wherein said second transfer means comprises an AND gate.

23. An apparatus according to claim 20, wherein said data writing means generates the data for clearing the first data stored in the memory means and writes the generated data into the memory means when said first and second transfer means both disable the data transfer.

24. An apparatus according to claim 20, wherein said data writing means synthesizes the first data latched by said latch means with the second data and writes the synthesized data into the memory means when said first and second transfer means both enable the data transfer.

25. An apparatus according to claim 20, wherein the memory stores bit map data.

26. An apparatus according to claim 20, wherein the second data is input to said apparatus from a host computer.

* * * * *

UNITED STATES PATENT AND TRADEMARK OFFICE
CERTIFICATE OF CORRECTION

PATENT NO. : 6,577,313 B1
DATED : June 10, 2003
INVENTOR(S) : Masayoshi Suzuki et al.

It is certified that error appears in the above-identified patent and that said Letters Patent is hereby corrected as shown below:

Column 3,
Lines 4 and 37, "la" should read -- 1a --.

Column 4,
Line 3, "la" should read -- 1a --.

Column 5,
Line 43, "to." should read -- to the --.

Column 7,
Line 26, "into" should read -- to --; and
Line 27, "form" should read -- from --.

Signed and Sealed this

Sixteenth Day of March, 2004

JON W. DUDAS
*Acting Director of the United States Patent and Trademark Office*